United States Patent [19]
Tarcza

[11] 3,915,720
[45] Oct. 28, 1975

[54] MACHINABLE HYDROTHERMALLY-CRYSTALLIZED GLASS BODIES

[75] Inventor: Walter H. Tarcza, Painted Post, N.Y.

[73] Assignee: Corning Glass Works, Corning, N.Y.

[22] Filed: Oct. 7, 1974

[21] Appl. No.: 512,242

[52] U.S. Cl. .................. 106/39.6; 65/18; 65/30; 65/33
[51] Int. Cl.² ........................................... C03C 3/22
[58] Field of Search .......... 106/39.6, 52; 65/30, 33, 65/18

[56] References Cited
UNITED STATES PATENTS

| | | | |
|---|---|---|---|
| 3,498,802 | 3/1970 | Bickford et al. | 106/39.6 |
| 3,498,803 | 3/1970 | Stookey | 106/39.6 |
| 3,811,853 | 5/1974 | Bartholomew et al. | 106/39.6 |

OTHER PUBLICATIONS
Lacey, E. D. – "The Hydration & Dehydration of Alumino Silicate Glasses," Chem. Abstracts 68, 5819n.

Primary Examiner—Helen M. McCarthy
Attorney, Agent, or Firm—Clinton S. Janes, Jr.; Clarence R. Patty, Jr.

[57] ABSTRACT

The instant invention is concerned with the production of glass bodies which, after being hydrothermally crystallized, exhibit a relatively high degree of machinability and good chemical durability. Such bodies are produced by hydrating glass particles having compositions within a very narrow interval of the $Na_2O$—$Al_2O_3$—$MgO$—$SiO_2$ field. The hydration simultaneously results in the development of quartz crystals and causes the glass particles to sinter together into an integrated solid body which can be readily shaped and drilled by hand and machine tools. Upon firing to remove the water in the glass structure, a porous body is produced that will exhibit no more than 10% linear shrinkage and, most preferably, less than 5%.

1 Claim, No Drawings

MACHINABLE HYDROTHERMALLY-CRYSTALLIZED GLASS BODIES

The ability to hydrate alkali metal-containing silicate glasses in a steam atmosphere at elevated temperatures and pressures has been variously described in the prior art. One illustration of such a disclosure is U.S. Pat. No. 3,498,802 which discusses the hydration of alkali metal silicate glass powders in steam. During the hydration process, water penetrates into the structure of the glass to impart thermoplastic properties thereto and can result in products exhibiting the behavior of hydraulic cements. Those glasses are reported to consist essentially, in mole percent on the oxide basis, of 80–95% $SiO_2$ and 6–20% $Na_2O$ and/or $K_2O$, the total of those components constituting at least 90% of the composition. CaO and $Li_2O$ are noted as being preferably absent but various compatible metal oxides such as $B_2O_3$, BaO, $Al_2O_3$, MgO, PbO, and ZnO could be included as optional ingredients. The hydration process comprised subjecting the glass powders to a gaseous environment containing at least 50% by weight steam at a pressure of at least one atmosphere and a temperature customarily between about 100°–200°C. The steam treatment was undertaken for a sufficient length of time to cause the development of at least a surface layer on the powders which had a water content of up to about 30% by weight. When the hydrated powders were heated to about 80°–120°C., they were observed to become adhesive and cohesive such as to permit their formation into shapes of different geometries via such conventional forming means as extrusion, injection molding, pressing, and rolling.

The reaction mechanism involved in the steam hydration of alkali metal silicate glasses and the differences observed in the physical properties of the hydrated glass, when compared with those of the original anhydrous glass, are reviewed in some detail in U.S. Pat. No. 3,498,803. That patent, a companion disclosure to U.S. Pat. No. 3,498,802, supra, explains that the inclusion of water within the glass structure converts the parent anhydrous glass into a rubbery or plastic material. The glass compositions described consisted esentially, in mole percent on the oxide basis, of 6–40% $Na_2O$ and/or $K_2O$ and 60–94% $SiO_2$, the total of those constituents comprising at least 85% of the composition. Here again, CaO and $Li_2O$ were desirably absent but such compatible metal oxides as $B_2O_3$, BaO, $Al_2O_3$, MgO, PbO, and ZnO could optionally be included. The hydration process contemplated exposing the glass bodies to a gaseous atmosphere containing at least 50% by weight steam at a pressure of at least one atmosphere and at an elevated atmosphere, commonly between about 80°–200°C. The hydration treatment yielded glass bodies having at least a surface portion containing about 5–30% by weight $H_2O$.

Certain compositional areas of U.S. Pat Nos. 3,498,802 and 3,498,803, supra, yielded products which demonstrated such poor chemical durability and resistance to weathering that, unless the surfaces thereof were protected from the ambient environment, they quickly lost their rubbery or plastic-like properties. U.S. Pat. No. 3,811,853 discloses the production of hydrated alkali metal silicate glass articles, particularly containers, which will self-degrade in the ambient environment. Thus, glass articles consisting essentially, by weight on the oxide basis, of 10–30% $Na_2O$ and/or $K_2O$ and 65–90% $SiO_2$, the total of those components constituting at least 80% of the composition, are hydrated and provision made for achieving a weathering-resistant surface thereon. The self-degradation commences spontaneously when the weathering-resistant surface is purposely penetrated or removed, thereby exposing the poorly-durable, hydrated interior portion to the atmosphere.

Pending U.S. application Ser. No. 445,453, filed Feb. 25, 1974, discloses a method for producing hydrated alkali metal silicate glass bodies which can exhibit the forming capabilities and physical properties approaching or even surpassing those of high polymer organic plastic bodies, and which can also demonstrate practical chemical durability and weathering resistance. That invention involves a two-step process wherein an initial hydration is conducted in a saturated or nearsaturated steam atmosphere at elevated temperatures and pressures and, thereafter, the body is subjected to a dehydration treatment at a lower relative humidity. The removal of water from the glass structure can be regulated during the dehydration step such that the amount remaining in the glass can be controlled to yield the desired thermoplastic behavior while also providing the necessary chemical durability thereto. However, care must be exercised in the dehydration step to avoid foaming of the glass. The operable glass compositions described therein consist essentially, in mole percent on the oxide basis, of 3–25% $Na_2O$ and/or $K_2O$ and 50–95% $SiO_2$, the total of those constituents comprising at least 55 mole percent of the composition. $Al_2O_3$, $B_2O_3$, BaO, CaO, CdO, MgO, PbO, and ZnO are suggested as optional components.

In pending U.S. application Ser. No. 445,454, filed concurrently with Ser. No. 445,453, supra, there is disclosed a method especially designed for hydrating alkali metal silicate glass particles or other fine-dimensioned glass bodies. The method disclosed is a specifically-defined, one-step steam hydration applied to glass compositions of similar parameters to those of Ser. No. 445,453 discussed above. Basically, the steam hydration is undertaken in atmospheres of relatively low water content or, in the case of special compositions, at greater water contents and at much higher temperatures. Careful control of the amount and rate of water diffused within the glass structure can be exercised through the interrelationship of glass composition and water content in the steam environment. Because the water content of the steam atmosphere is low and-/or the glass composition is resistant to hydration, the invention is particularly directed to bodies of fine-dimensioned forms.

In both Ser. No. 445,453 and Ser. No. 445,454, supra, the steam hydration of fine-dimensioned bodies, e.g., powders, beads, fibers, etc., normally results in the agglomeration or sintering of the bodies into an integral mass.

The characteristic of machinability is generally defined as possessing the potential for being turned, shaped, planed, milled, or otherwise worked or fashioned by hand or machine-operated tools. Anhydrous glass is commonly recognized as a hard, brittle material having very poor machinability properties. As a result, after a glass article has been produced through hot forming, little can be done to alter the shape thereof. Thus, one severe shortcoming in the use of glass as a structural material has been its essential inability to be "field-worked," i.e., to be shaped and fitted on a job site.

As has been noted above, the penetration of water within the glass structure imparts a plastic-like character to the glass. Hence, the hardness and brittleness of anhydrous glass is removed. However, the chemical durability of the hydrated glass is frequently less than satisfactory and, when the hydrated glass is fired to remove the water, foaming and substantial deformation of the body result.

Therefore, the primary objective of the instant invention is to provide a glass composition which, when hydrated in the form of fine-dimensioned bodies, will yield a material having relatively good machinability properties and which can be fired to remove the water with essentially no foaming and very little shrinkage.

That objective can be achieved with glass compositions within the very narrow ranges consisting essentially, by weight on the oxide basis, of about 2–5% $MgO$, 2–5% $Al_2O_3$, 15–20% $Na_2O$, and 75–80% $SiO_2$.

The following example is illustrative of the compositional and procedural parameters of the invention.

EXAMPLE

A batch for a glass having the approximate composition, in weight percent on the oxide basis, of about 76.5% $SiO_2$, 17% $Na_2O$, 3.5% $Al_2O_3$, and 3% $MgO$ was compounded. The actual batch ingredients can be any materials, either the oxides or other compounds, which, when fused together, will be converted to the desired oxide compositions in the proper porportions. The batch components were ballmilled together to insure careful mixing and then melted in open platinum crucibles for about 16 hours at 1,450°–1,550°C. It will be recognized that larger melts can be made in pots or continuous melting tanks in accordance with conventional commercial glass melting practice. Therafter, the melts were cooled and shaped into glass bodies. Since glass bodies of small dimensions are desired, a stream of molten glass can be passed through a hot flame, through an air blast, or into water. If desired, thin ribbon can be drawn which is then broken into flakes or large bulk bodies can be formed which are thereafter crushed into small particles. From a practical point of view, this latter alternative is not viewed with favor in light of the time and expense required in reducing large glass shapes into fine particles. In general, particles having a thickness dimension of no more than about 5 mm. are to be preferred.

In the present case, hydration of the glass particles was conducted in an autoclave since close control of steam pressure, relative humidity, and temperature can conveniently be exercised in such an apparatus. The particles were placed in a TEFLON-coated container which was horizontally supported above the floor of the autoclave. It will be appreciated that the glass particles can be retained on other material which are non-adhering and non-reactive at the operating temperatures of the autoclave. The autoclave was sealed and heated to generate steam at a desired pressure. Commonly, steady state operation of the autoclave was obtained in about three to four hours, although longer periods of time were sometimes necessary at the higher operating temperatures.

The length of time required to completely hydrate the glass particles therethrough is directly related to the $H_2O$ pressure and temperature employed in the hydration process and inversely proportional to the cross-section of the anhydrous glass body being treated. Hence, higher treatment temperatures and $H_2O$ pressures will normally yield more rapid hydration. Conversely, the thicker the cross section of the glass body, the longer the time will be demanded to hydrate therethrough. Concomitant with the penetration of water into the glass structure, crystals of alpha-quartz develop, these crystals being less than 10 microns in diameter and, commonly, less than 5 microns.

As was explained in U.S. applications Ser. Nos. 445,453 and 445,454, supra, the term "relative humidity" is not totally applicable as descriptive of a $H_2O$-containing atmosphere at very high temperatures since the definition thereof inherently contemplates a level of saturated vapor pressure. Hence, there is a critical temperature, i.e., a maximum temperature at which any gas can be liquefied, and a critical pressure, i.e., the pressure required to liquefy a gas at its critical temperature. For $H_2O$, the critical temperature is about 374°C. and the critical pressure about 3,200 psi. Above the critical temperature, $H_2O$ has been denominated a fluid which is not deemed to be either a liquid or a gas.

In the above-cited United States applications, a discussion is presented of this phenomenon and reference drawn to pages 180 and 181 of "Hydrothermal Crystal Growth," R. A. Laudise and J. W. Nielsen, *Solid State Physics*, 12, pp. 149–222, Academic Press, New York, 1961. As is explained therein, based upon the concept of "filling factor," i.e., the percentage of the volume of the autoclave or other pressure vessel which is filled with liquid $H_2O$ at ambient temperature, the person of ordinary skill in the art, and being provided with the standard steam tables, could readily determine the necessary filling factor to achieve a desired saturated or less than saturated steam atmosphere at temperatures below 374°C. and, at temperatures above 374°C., could select a filling factor to secure any desired pressure at a particular temperature. Hence, at above the critical temperature, one can reasonably extrapolate the behavior of the environment thereat from that of an environment of a certain relative humidity below the critical temperature.

Therefore, the term relative humidity is used in the present case in the same sense as utilized in the above-cited United States applications when hydration temperatures above 374°C. are employed. Reference is hereby made to those applications and the Laudise and Nielsen discussion referred to above for further explanation.

In the following description, a commercially available autoclave was used having a treatment chamber of 9 cubic feet. Steam pressure was generated by heating distilled water placed in the bottom of the vessel. The pressure was regulated through control of the temperature. The desired humidity therein was achieved by predetermining the amount of water required for that humidity at a particular temperature (filling factor). To aid in securing reproducibility of results, the autoclave was thoroughly dried prior to using. Where small amounts of glass are treated, the water absorbed thereby during hydration is not of such an amount to cause any substantial loss in pressure. In general, filling factors of about 10% and less were utilized in the following treatments.

As was observed above, particles having thickness dimensions of no more than about 5 mm. are to be preferred such that complete hydration can be attained within a not unreasonably long period of time. This has resulted in the general use of particles ranging in size from a No. 4 United States Standard Sieve (4.76 mm.) to a No. 400 United States Standard Sieve (37 microns). It is quite apparent that for the very fine particles only a relatively short exposure time in the autoclave, e.g., 1–4 hours, can be sufficient at very elevated temperatures and humidities; whereas substantially longer treatment times, e.g., 72–144 hours, can be demanded with larger particles under the same hydration conditions. From a practical point of view, the hydration exposure will be continued only for the time necessary to complete the penetration of $H_2O$ through the glass particles. Further treatment does not appear to have any deleterious effect upon the product and can lead to the development of greater amounts of crystallization which can be beneficial in improving the machinability character of the final product. The mechanism of the hydration reaction is not fully understood but the rate of $H_2O$ penetration into the glass appears to approximate the law of diffusion, i.e., the depth of penetration is proportional to the square root of time where the treatment conditions are maintained constant. The glass particles of the present composition flow during the hydration step to form an integral sintered body.

After the hydration treatment, the autoclave is customarily allowed to cool to at least below 100°C. at its own rate before the samples are removed therefrom. Nevertheless, withdrawal at elevated temperatures is practical if the water is first drained out of the autoclave. The amount of water taken up by the glass can be calculated by comparing the weight of the glass in the anhydrous state with that after the hydration exposure.

A hydration temperature of at least 100°C. and, preferably, higher than 150°C. has been found necessary to complete the hydration of the present glasses within a reasonable length of time. For practical reasons, the maximum temperature employed for hydration will be held below the softening point of the anhydrous glass. Hence, where the equipment is capable of operating at temperatures of 500°–600°C., such temperatures are technically feasible.

The following table reports the process parameters employed with a number of samples along with density measurements and calculated water contents for each. For convenience, conversion equivalents of the United States Standard Sieve values referred to in the table are set out below:

80 mesh = 177 microns
140 mesh = 105 microns
200 mesh = 74 microns

The densities of the materials are recorded in terms of lbs/ft³ (pcf) and the absorbed water contents in terms of percent (%).

TABLE I

| Sample No. | Grain Size (mesh) | Autoclave Treatment Temp., °C. | Pressure (psi) | Time (hours) | Water Content % | Hydrated Density (pcf.) |
|---|---|---|---|---|---|---|
| 1 | −80+140 | 240 | 475 | 115 | 30 | 100 |
| 2 | −80+140 | 245 | 520 | 108 | 30 | 100 |
| 3 | −140+200 | 200 | 240 | 26 | 26 | 77 |
| 4 | −140+200 | 220 | 360 | 17 | 20 | 61 |
| 5 | −140+200 | 240 | 520 | 10 | 26 | 72 |
| 6 | −140 | 245 | 520 | 108 | 30 | 116 |
| 7 | −200 | 240 | 505 | 29 | 19 | 136 |
| 8 | −200 | 283 | 960 | 2 | 18 | 105 |

In each instance, a sintered, white opaque slab was produced having the approximate dimensions 1.25 inches × 1 inch × 0.75 inch which could be sawed and drilled using both hand and machine tools. With some care, the material could be worked on a lathe. The crystallinity observed in the slabs varied from about 25% by volume up to about 80%.

Where desired, the hydrated glass can be returned to the basic anhydrous condition by firing to remove the included water. Some $H_2O$ can be removed by simply heating the body in air at temperatures somewhat above 100°C. but experience has demonstrated that more complete removal of water within a reasonable time can be had at firing temperatures in excess of 300°C., e.g., about 1–4 hours. The maximum temperature is defined by the deformation temperature of the body. Hence, a short time firing at high temperatures, e.g., 800°C. for 15 minutes, has been found satisfactory. However, firing at 400°–600°C. is preferred since deformation of the glass is not hazarded and the removal of water is quite rapid at those temperatures. The resultant body is porous and exhibits chemical and physical properties resulting from the composite microstructure of alpha-quartz crystals in a siliceous glassy matrix. This can be particularly important where chemical durability is of importance.

Table II illustrates the firing practice. A portion of each slab resulting from the samples of Table I alone was placed in an electrically-fired furnace and heated to 500°C., the atmosphere within the furnace being simply the ambient environment. After about 1 hour at temperature, the slabs were withdrawn from the furnace and examined. Essentially no cracking or foaming of the bodies was observed and linear shrinkage was measured to be less than 10%. Most preferably, the shrinkage will be held to less than 5%.

A modulus of rupture in excess of 1,000 psi is common and individual measurements up to 1,325 psi have been observed. Compressive strengths exceeding 4000 psi are customary with single values up to 5,200 psi being measured.

TABLE II

| Sample No. | Density (pcf.) | Water Content | Open Porosity | Typical Linear Change |
|---|---|---|---|---|
| 1 | 70 | <0.1% | 46% | 2% |
| 2 | 70 | <0.1% | 57% | 4% |
| 3 | 57 | <0.1% | 61% | 5% |
| 4 | 49 | <0.1% | 64% | 5% |
| 5 | 53 | <0.1% | 70% | 9% |
| 6 | 81 | <0.1% | 46% | 3% |
| 7 | 110 | <0.1% | 35% | 5% |
| 8 | 86 | <0.1% | 33% | 6% |

In the above examples, a saturated atmosphere was employed during the hydration step. Such must be recognized to be merely a matter of convenience since, in general, the hydration reaction proceeds more rapidly in atmospheres of high relative humidity. Hence, the use of lowere relative humidity environments such as is disclosed in Ser. No. 445,454, supra, can effectively be employed and, where a particular water content is desired within the hydrated glass, the two-step practice described in Ser. No. 445,453, supra, can be successfully used here. However, I have determined that a water content of at least 10% by weight is normally required to insure the desired machinability. Table III reports samples of the glass discussed in Tables I and II which had been treated in atmospheres of lower relative humidity. The character and identity of the crystallization is not altered through the use of lower humidity environments. In general, relative humidities of at least 50% are to be preferred.

The density measured after firing the bodies at about 500°C., in accordance with the practice described above, is also recorded.

those ranges and essentially free of extraneous components are much to be preferred. Any additions of extraneous components must be limited to less than about 5% total.

Table IV records a number of glass compositions, expressed in weight percent on the oxide basis, which did not display the desired machinability after hydration and/or exhibited extensive cracking and/or foaming during the water-removal step.

TABLE IV

|         | 9    | 10 | 11 | 12   | 13   | 14 | 15   |
|---------|------|----|----|------|------|----|------|
| $SiO_2$ | 73.3 | 57 | 88 | 67.5 | 71.3 | 70 | 77.7 |
| $Na_2O$ | 16.4 | 4  | 10 | 18.0 | 17.8 | 20 | 4.2  |
| $K_2O$  | 0.2  | 8  |    |      |      |    | 12.5 |
| $Al_2O_3$ | 1.5 | 1  | 2  |      | 2.0  |    | 3.8  |
| PbO     |      | 30 |    |      |      |    |      |
| MgO     | 3.5  |    |    |      |      |    | 1.8  |
| CaO     | 5.1  |    |    |      |      |    |      |
| ZnO     |      |    |    | 14.5 | 6.9  |    |      |
| BaO     |      |    |    |      | 2.0  |    |      |
| CdO     |      |    |    |      |      | 10 |      |

TABLE III

| Sample No. | Grain Size (mesh) | Temp., °C. | Autoclave Treatment Pressure (psi) | Time (hours) | Relative Humidity | Water Content % | Hydrated Density (pcf.) | Fired Density |
|---|---|---|---|---|---|---|---|---|
| 1 | −80+140 | 240 | 400 | 80  | 77% | 18 | 101 | 83 pcf. |
| 2 | −80+140 | 240 | 390 | 120 | 74% | 19 | 107 | 87 pcf. |

The resulting sintered, white opaque slabs produced exhibited the same machinability characteristics as those reported in Table I and could likewise be fired to an anhydrous condition with essentially no cracking or foaming and with a linear shrinkage of less than 5%.

This capability of developing glasses demonstrating good machinability in the hydrated state, and which can thereafter be fired to the anhydrous state without cracking, foaming, or shrinking excessively, is severely limited to the narrow range of $Na_2O$, $Al_2O_3$, MgO, and $SiO_2$ set out above. Hence, compositions solely within

I claim:

1. A hydrated, sintered glass-ceramic body in which the crystalline phase is alpha-quartz between 25–80% by total volume, said body exhibiting a high degree of machinability and good chemical durability consisting essentially, by weight on the oxide basis, of about 2–5% MgO, 2–5% $Al_2O_3$, 15–20% $Na_2O$, and 75–80% $SiO_2$, and containing between about 15–30% by weight absorbed $H_2O$.

* * * * *